United States Patent [19]
Goodman

[11] Patent Number: 6,088,210
[45] Date of Patent: Jul. 11, 2000

[54] PROTECTIVE DEVICE FOR ELECTROMAGNETS

[76] Inventor: Paul Richard Goodman, 2504 Scouting Trail, Raleigh, N.C. 27615

[21] Appl. No.: 09/160,080

[22] Filed: Sep. 24, 1998

Related U.S. Application Data

[60] Provisional application No. 60/059,653, Sep. 25, 1997.

[51] Int. Cl.[7] .............................. H01H 9/00; H02H 9/00
[52] U.S. Cl. .................. 361/160; 361/91.1; 361/111; 361/118
[58] Field of Search .................. 361/18, 56, 111, 361/115, 91.1, 118, 127, 100, 160, 187

[56] References Cited

U.S. PATENT DOCUMENTS 3,708,685  1/1973  Miller et al. .............................. 307/104

Primary Examiner—Stephen W. Jackson
Attorney, Agent, or Firm—Richard S. Faust

[57] ABSTRACT

A solid state device protects large industrial electromagnets from the effects of dissipating stored magnetic energy when the supply voltage to the electromagnet is removed (for example, by accidental cutting of the power cables) while the electromagnet is energized. The device also serves as a safety device to protect operating personnel against serious injury or death when the personnel disconnect the electromagnet and power cables while the electromagnet is energized. The device monitors the voltage at the terminals of an electromagnet and, when the voltage exceeds a predetermined trigger voltage indicating an open magnet discharge path, causes the magnet energy to be safely dissipated in a power semiconductor circuit.

13 Claims, 4 Drawing Sheets

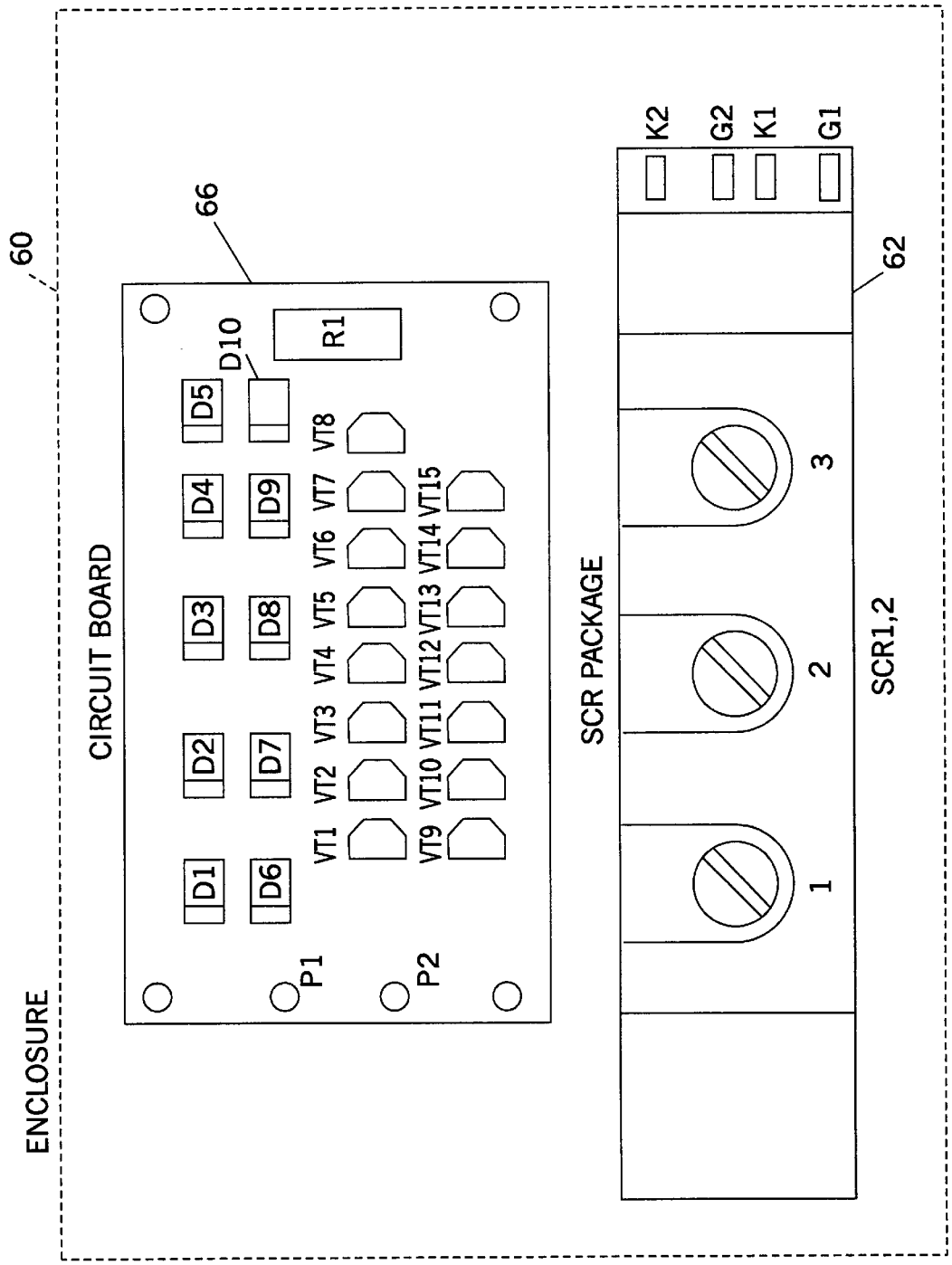

PROTECTIVE DEVICE FOR ELECTROMAGNETS

CROSS REFERENCE TO RELATED APPLICATION

This application claims the benefit under Title 35, United States Code §119(e) of U.S. Provisional Patent Application Ser. No. 60/059,653, filed Sep. 25, 1997.

FIELD OF THE INVENTION

The invention relates to the protection of large electromagnets from the detrimental effects of destructive voltages within the magnet when the power cables are cut or pulled from the magnet while it is energized. The invention also serves as a safety device to protect operating personnel against serious injury or death when the personnel disconnect the electromagnet power cables while the magnet is energized.

BACKGROUND OF THE INVENTION

An electromagnet, or lifting magnet, is a large inductor enclosed in a steel or cast iron case. The electromagnet is used primarily in the steel industry, including scrap processing and manufacturing, for material handling purposes. Most magnets are supplied power from a generator or rectifier at 230 VDC through a magnet controller. Typical industrial magnets range in size from 39 inches to over 100 inches in diameter with full load currents as high as 350 amperes, or more.

As inductors, electromagnets store energy. When a magnet is energized, energy is stored in a magnetic field that is created by the current in the magnet windings. When the supply voltage is removed, the magnetic field begins to collapse. A very important fact is that the voltage across an inductor can change instantly, but the current through an inductor cannot change instantly. Moreover, an inductor opposes any change in current. Therefore, as the field collapses, its polarity is reversed and the inductance becomes a source utilizing the stored energy in an effort to maintain the current.

Because an electromagnet stores energy it must be turned off in a very controlled fashion. The stored magnet energy must be dissipated in such a way that the voltage created within the magnet and at its terminals does not reach destructive levels. Typically, this is accomplished through the magnet controller. When a magnet is de-energized by a controller, the magnet terminals are shorted with a low impedance device such as small value, high wattage, resistor. The discharge terminal voltage is therefore held very low by shunting the magnet current that is being maintained by the collapsing magnetic field, through the discharge resistor. When the magnet terminals are not connected to a resistor, such as when the magnet is open circuited, the terminal resistance can approach infinity. The magnetic field must still dissipate its stored energy. The terminal voltage will therefore rise rapidly, also approaching infinity. The voltage within the magnet will eventually become high enough to cause the insulation within the magnet to fail. When the insulation fails it provides a low resistance path for the magnet current to be maintained. The magnetic field is therefore able to dissipate its stored energy. The insulation previously protected the magnet from short circuits. Once the insulation is overcome by the extremely high internal voltages, the magnet is destroyed. A magnet can easily become open circuited during operation and therefore become subjected to the above-described destructive voltage levels. This frequently occurs when the power cables are accidentally cut or pulled from the magnet while it is energized.

A related safety problem occurs when a worker, thinking the magnet is not energized, intentionally disconnects the electromagnet power cables, for example by manually pulling apart a cable connector. Under these conditions, an enormous arcing voltage up to 60,000 or more volts may occur at the connector and result in serious injury or death to the worker.

In the past, others have attempted to solve the above magnet destruction and personnel safety problems using a spark gap surge arrester. This device consists of two sharply pointed electrodes connected across the magnet terminals. The electrodes are spaced apart at a distance that causes the air gap between them to break down at elevated voltages and discharge the magnet's stored energy in the arc voltage that occurs. This is a crude device and the voltage cannot be easily determined or controlled. It is also easily susceptible to damage. Other typical surge arrester type devices have also been tried but without success. They either could not handle the power dissipation levels or were too large to be installed on the magnet. Thus, prior art with regard to protecting electromagnets and workers from the effects of the very high voltage levels created by an open discharge path is unsatisfactory due to inherent design limitations.

SUMMARY OF THE INVENTION

The present invention, in one broad aspect, is a solid state device that monitors the voltage at the terminals of an electromagnet and, when the voltage exceeds a predetermined trigger voltage indicating an open magnet discharge path, causes the magnet energy to be safely dissipated in a power semiconductor circuit. The device includes a trigger circuit for monitoring the terminal voltage of an electromagnet and producing a gate signal when a voltage transient in excess of a predetermined trigger voltage occurs. The device also includes a normally blocking bilateral power semiconductor circuit connected across the terminals of the electromagnet for conducting the magnet current and dissipating the magnetic energy therein in response to a gate signal produced by the trigger circuit. The power semiconductor componentry most preferably takes the form of a pair of silicon controlled rectifiers connected in opposing polarity across the magnet terminals, although other blocking-type devices that can withstand the applied voltages and can be turned on with an appropriate trigger signal may be utilized. Preferably the trigger circuit takes the form of a string of bilateral trigger devices, for example sidacs, that upon reaching a predetermined trigger voltage will switch from a blocking state to a low voltage on-state that will apply a gate signal to the SCR's causing the appropriately directed SCR to conduct the magnet discharge current. The gate signal may be derived from other types of circuits that are designed to monitor the discharge voltage of the magnet and cause a trigger signal to be applied to the power control device.

One desirable feature of the magnet protector of the invention is that during operation in the conducting state, it holds the terminal voltage of the magnet to a very low value. Typically, this value may be equal to the voltage drop across the power semiconductor circuit, which may be in the range from about 0.25 to 5 volts, with a more preferred range being about 0.5 to 1.5 volts. By holding the magnet terminal voltage to a very low value while allowing the magnet current to dissipate through the device, the magnet protector is able to limit the power that is developed while the magnet is discharging. This is one important feature of the operation of the device. In contrast, prior art devices have clamped the terminal voltage during discharge at a relatively high value while dissipating the magnet current, thereby generating an enormous amount of power that causes destruction of the device.

The voltage level at which the magnet protector operates is set at a value that is high enough above the normal magnet discharge voltage so that false tripping is not a problem. The maximum discharge voltage of a magnet, during normal operation, is determined by the size of the magnet and the associated magnet controller. Some controllers use resistors and others use varistors. The varistor-type controller typically has a lower discharge voltage than a resistor-type. Due to these differences in maximum discharge voltages, magnet protectors of the invention may be made available with different discharge voltage levels to accommodate the different types of controllers.

As mentioned above, the magnet protector preferably uses a back-to-back SCR arrangement for the power circuit. A high powered triac, essentially two SCR's connected together in inverse parallel, is a functional equivalent to the back-to-back SCR arrangement. For purposes of this document, these arrangements shall be considered equivalent.

The magnet protector of the invention is bilateral, i.e., not polarity sensitive. It can sense voltage in either direction and send a gate signal to the appropriate power circuit component (e.g. SCR) because of input diodes incorporated into the voltage sensing circuit. The diodes are connected in series, cathode to cathode, with their anodes connected to the magnet terminals. This arrangement allows voltage sensing on the magnet terminals without shorting the supply voltage. Several diodes are used to increased the withstand voltage. The gate signal for the SCR is derived from the midpoint of the diode setting.

When used as a retrofit, the magnet protector may be mounted directly to the magnet in an existing terminal box or a box added to house the unit. The magnet protector may also be incorporated into a new or remanufactured magnet as an integral part of the magnet structure.

BRIEF DESCRIPTION OF THE DRAWINGS

Some of the features of the invention having been stated, other features will appear as the description proceeds, when taken in connection with the accompanying drawings, in which:

FIG. 4 is a view of the magnet protector of FIG. 3 with a portion of the housing removed to facilitate illustration.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
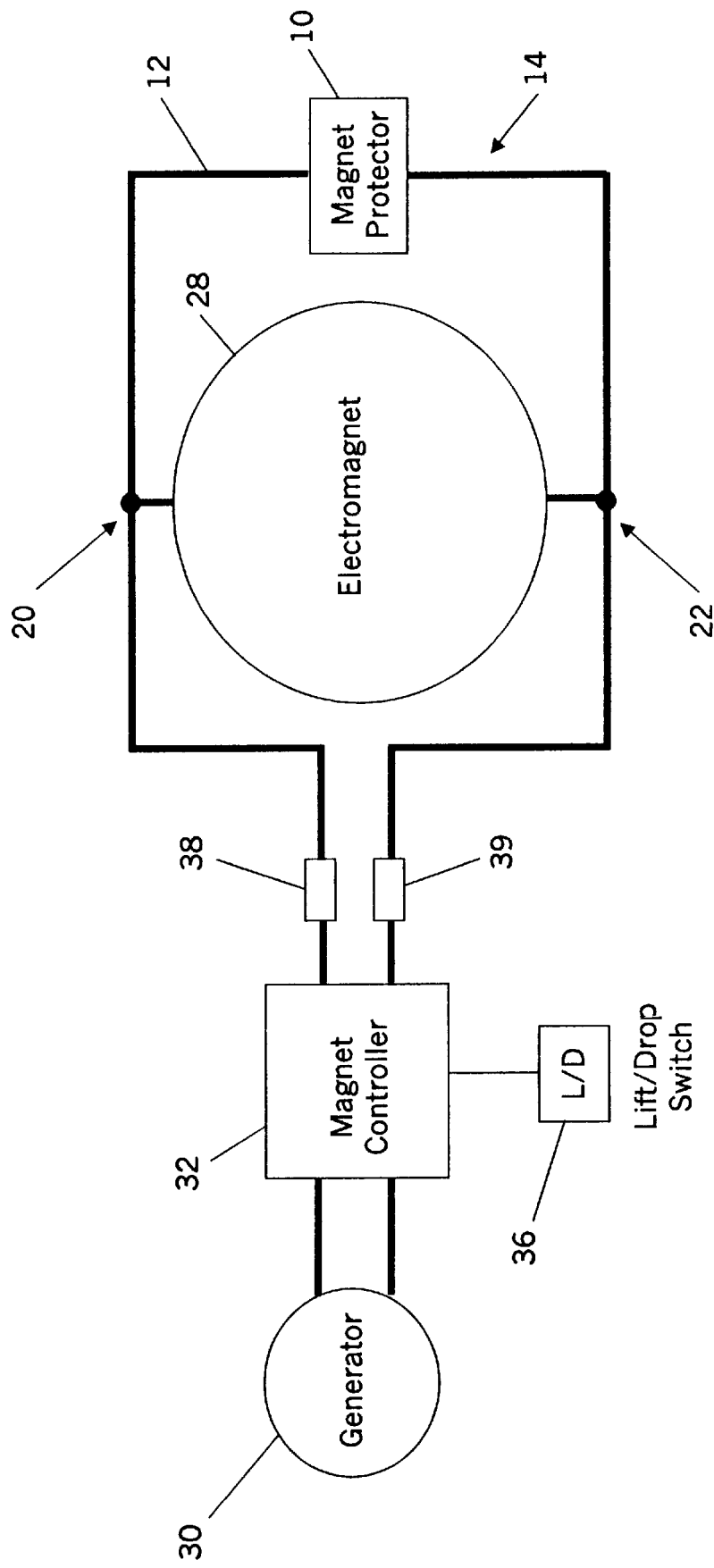
FIG. 1 is a block diagram of a conventional large industrial electromagnet, power source and control circuit, with the magnet protector of the invention installed across the terminals of the electromagnet.
Figure 5:
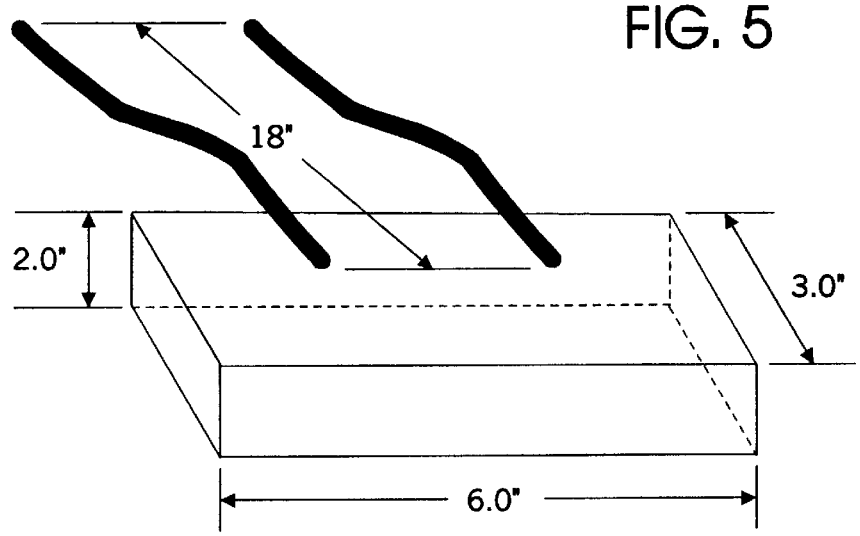
FIG. 5 is a pictorial view of the magnet protector of FIGS. 3 and 4 showing the two wire leads that connect to the electromagnet terminals.

Referring to the drawings, and particularly to FIG. 1, there is shown a magnet protector 10 of the invention installed by leads 12, 14 across the terminals 20, 22 of a conventional industrial electromagnet 28. In the manner well known in the art, electromagnet 28 is powered by a power source such as generator 30 through a magnet controller 32 operated by a lift/drop switch 36. Magnet protector 10 preferably is housed in a rugged, compact housing (FIG. 5) that is mounted within the terminal box of electromagnet 28 with the leads 12, 14 connected by lugs or the like to the electromagnet's terminals. In this regard, protector 10 preferably is located as close as possible to the magnet winding terminals to eliminate the possibility of protector 10 being disconnected from the magnet leads. A pair of manually operated, pin-type cable connectors 38, 39 permit a worker to disconnect the electromagnet from the power source.

Figure 2:
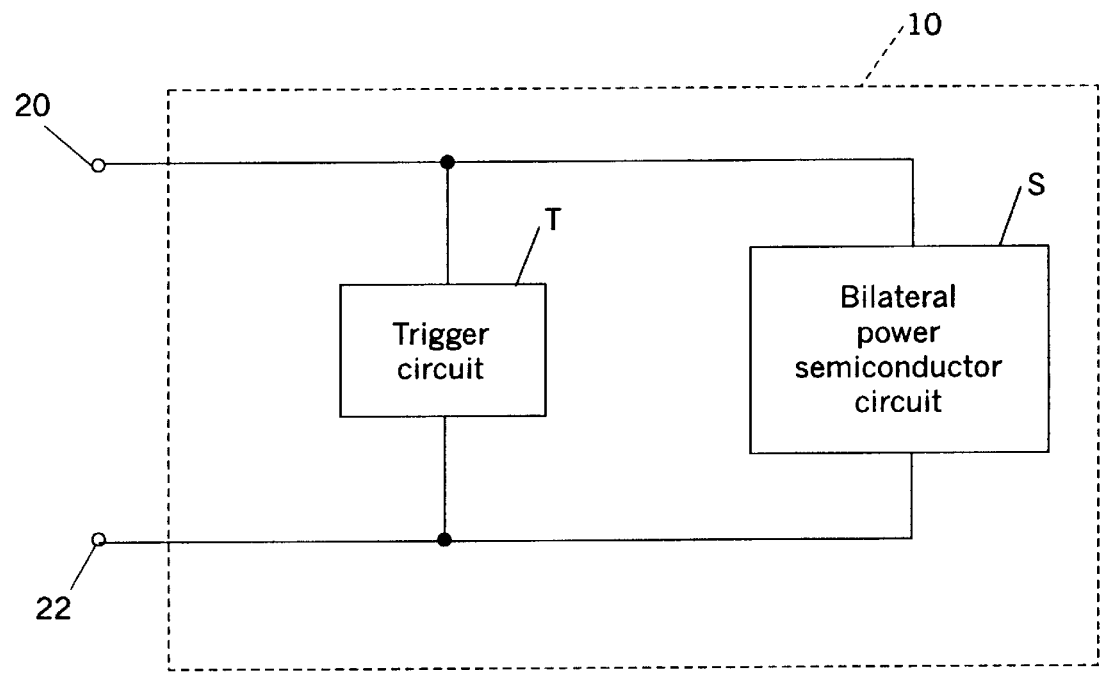
FIG. 2 is a simplified block diagram of the magnet protector of the invention.

Referring to FIG. 2, magnet protector 10, in its most basic form, is a solid state device including a trigger circuit T and a bilateral power semiconductor circuit S.

Figure 3:
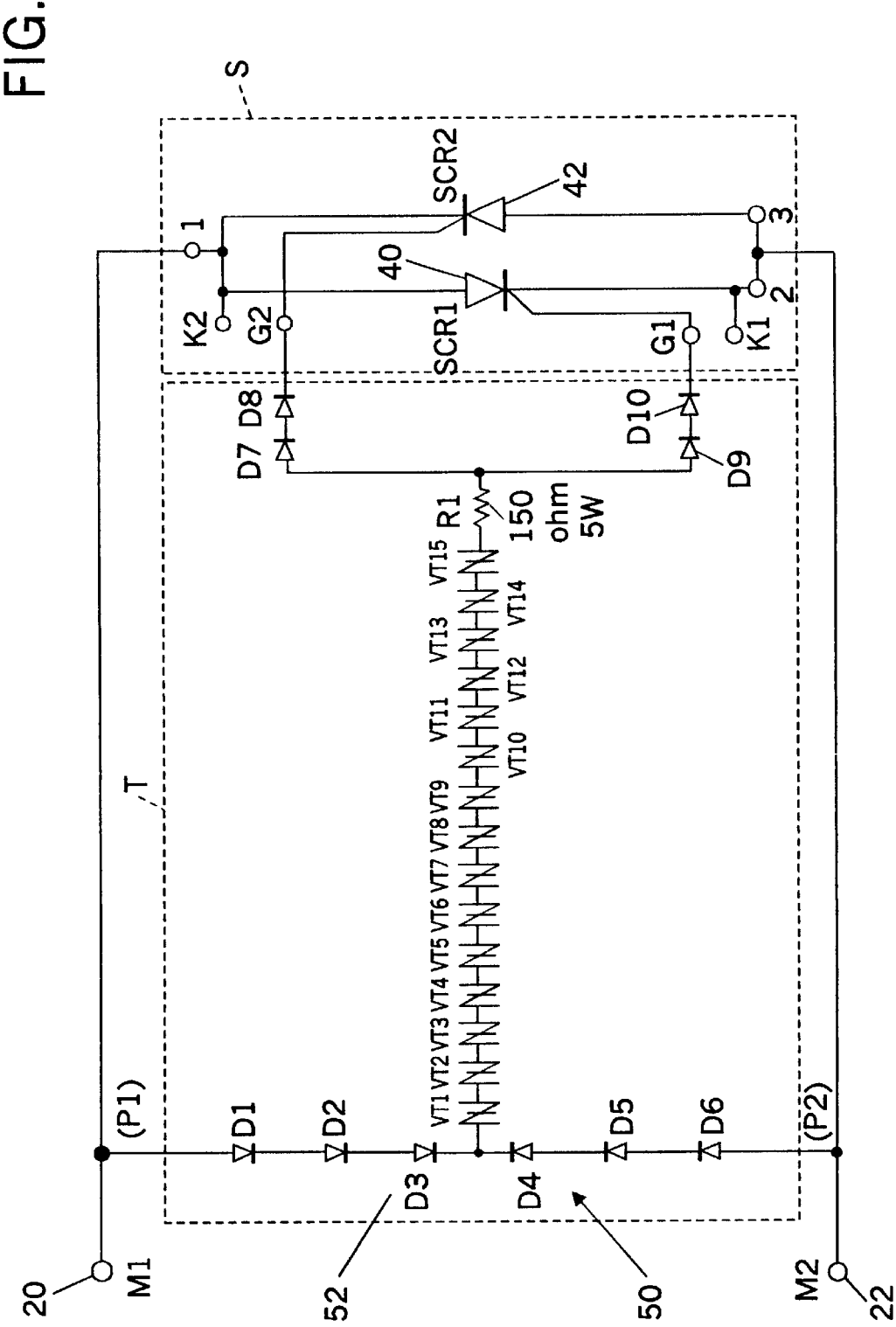
FIG. 3 is a circuit diagram of key components of one form of the magnet protector of the invention.

Turning to FIG. 3, there is shown a circuit diagram of one form of magnet protector 10 wherein the power semiconductor circuit S incorporates two silicon controlled rectifiers (SCR's) 40, 42 connected in opposing polarity across the magnet terminals 20, 22. In normal operation, the magnet protector 10 has no effect on the circuit. However, when a voltage transient in excess of the trigger voltage of trigger circuit T occurs, gate current is supplied to that SCR which is blocking forward voltage at that instant. When the SCR fires, it continues to conduct current for the duration of the magnet discharge cycle. During this time, the magnet terminal voltage is held to the voltage drop across the SCR terminals, which is typically less than one volt, thereby providing the protective mechanism for the magnet.

Trigger circuit T incorporates a high voltage trigger device, similar in operation to a triac, known as "sidac". Multiple sidacs VT1–VT15 are connected in series to obtain the desired trigger voltage of the protective device. In one preferred embodiment, the sidac selected for use has a breakover voltage range of 104–118 volts. By utilizing 15 of these sidacs in a string, the trigger voltage for the magnet protector (the sum of the fifteen sidac breakover voltages) will lie in the range of 1,560 to 1,770 volts, typically approximately 1,650. The trigger voltage is important. To prevent false operation, the trigger voltage should be greater than the maximum voltage developed by the magnet controller when de-energizing the magnet. Also, the trigger voltage must be lower than the maximum withstand or blocking voltage of the SCR selected. Voltage trigger devices other than sidacs, such as silicon bidirectional switches (SBS's) and diacs, may be used. However, other currently available alternatives generally do not have the higher voltage ratings of the sidac and would require significantly more devices to obtain the same trigger voltage. Thus, the sidacs are preferred.

Upon reaching the trigger voltage in either direction, the sidac string switches to a low-voltage on-state allowing the conduction of gate current. The gate current is directed by means of two of the fast recovery diode strings that are connected on either side of the trigger devices. These diode strings are connected in a series parallel arrangement. At the input to the trigger devices, a string of back to back diodes, with three diodes (D1, D2, D3 or D4, D5, D6) on each side, are used to handle the elevated discharge voltage that is impressed across the circuit. This diode arrangement, in conjunction with the diodes D7, D8 and D9, D10 connected to the gate of each SCR, provides for bilateral operation of the device. The maximum gate current is limited to either SCR by a series resistor R1. The speed of operation of the device is limited only by the turn-on time of the SCR, which is typically on the order of two microseconds or less.

The magnet protector can easily dissipate the large amounts of energy that are associated with electromagnets. This is possible due to the magnet terminal voltage being held low during the discharge cycle. Based on the formula P=IE, power is equal to current times voltage, the maximum power absorbed by the SCR is essentially equal to the maximum magnet current, with the SCR voltage drop being approximately one volt. The power rating of the SCR is therefore selected based on the maximum magnet current and the duration of the discharge cycle. After the magnet energy has dissipated and the current through the SCR drops below the holding current necessary for conduction, the device "resets" by proceeding once again to its blocking state.

In one preferred embodiment, a magnet protector designed for use with an industrial electromagnet having a maximum current rating of up to 180 amps, the SCR's have a 2000 V, 220 amp (RMS) rating, diodes D1–D10 are 600 V, 1 amp devices, resistor R1 is 1500 ohm, 5 watts and leads 12, 14 are #6 AWG wiring. The electronics of this embodiment, as shown in FIG. 3, are in an SCR package 62 and on a circuit board 66, both of which are contained in a housing 60. The exterior of the housing (FIG. 5) may take a small box-like form having dimensions on the order of 6.0"×2.0"×3.0", making it easily mountable within the terminal box of the electromagnet.

It will be appreciated that other electromagnets that have lower or higher maximum current ratings, for example, 50 amps, 75 amps, 130 amps, 280 amps and 350 amps, may utilize SCR's having corresponding lower or higher current ratings.

While the invention has been described in connection with certain illustrated embodiments, it will be appreciated that modifications may be made without departing from the true spirit and scope of the invention.

That which is claimed:

1. A method of dissipating stored magnetic energy in an electromagnet when the supply voltage path to the electromagnet is open circuited while the electromagnet is energized, said method comprising:

connecting a normally blocking bilateral power semiconductor circuit across the terminals of an electromagnet;

sensing the voltage across the terminals of the electromagnet and turning on the power semiconductor circuit when a voltage transient above a level indicative of an open circuit condition is sensed; and permitting the magnetic energy stored in the electromagnet to be dissipated by conducting magnet current through the power semiconductor circuit when the power semiconductor circuit is so turned on.

2. The method of claim 1 including the step of automatically resetting the bilateral power semiconductor circuit to its normal blocking state after the magnet energy has been dissipated and the current through the power semiconductor circuit drops below the holding current necessary for conduction.

3. The method of claim 1 including the step of holding the terminal voltage of the magnet as determined by the voltage drop across the power semiconductor circuit to a level in the range from about 0.25 to 5 volts.

4. The method of claim 1 including the step of holding the terminal voltage of the magnet as determined by the voltage drop across the power semiconductor circuit to a level in the range from about 0.5 to 1.5 volts.

5. A device for dissipating stored magnetic energy in an electromagnet when the supply voltage path to the electromagnet is open circuited while the electromagnet is energized, said device comprising:

a trigger circuit for monitoring the terminal voltage of an electromagnet and allowing conduction of a gate current when a voltage transient in excess of a predetermined trigger voltage occurs; and a normally blocking bilateral power semiconductor circuit connected across the terminals of the electromagnet for conducting the magnet current and dissipating the magnet energy therein when the trigger circuit allows production of a gate current.

6. The device of claim 5 wherein the trigger circuit comprises a string of bilateral trigger devices.

7. The device of claim 6 wherein the trigger devices are sidacs.

8. The device of claim 5 wherein the trigger voltage is greater than the maximum voltage developed by the magnet controller when de-energizing the magnet and lower than the withstand voltage of the power semiconductor circuit.

9. The device of claim 5 wherein said power semiconductor circuit includes blocking-type semiconductor devices that can withstand voltages applied to the circuit and can be turned on in response to the gate current.

10. The device of claim 9 wherein said blocking-type semiconductor devices include a pair of silicon controlled rectifiers connected in opposing polarity across the magnet terminals.

11. The device of claim 6 including a pair of diode strings with one string connected on each side of said string of bilateral trigger devices.

12. The device of claim 11 wherein said diode strings are connected in a series parallel arrangement.

13. In combination, an industrial electromagnet having terminals connected to a power source through a magnet controller, and a magnet protection device for dissipating stored magnetic energy in the electromagnet when the supply voltage path to the electromagnet is open circuited while the electromagnet is energized, said device comprising:

a trigger circuit for monitoring the terminal voltage of an electromagnet and allowing conduction of a gate current when a voltage transient in excess of a predetermined trigger voltage occurs; and a normally blocking bilateral power semiconductor circuit connected across the terminals of the electromagnet for conducting the magnet current and dissipating the magnet energy therein when the trigger circuit allows production of a gate current.

* * * * *